(12) United States Patent
Seol et al.

(10) Patent No.: US 12,206,927 B2
(45) Date of Patent: Jan. 21, 2025

(54) DISPLAY DEVICE AND METHOD FOR CONTROLLING SAME

(71) Applicant: LG ELECTRONICS INC., Seoul (KR)

(72) Inventors: Seongwoon Seol, Seoul (KR); Kyung Ryun Lee, Seoul (KR); Eunyoung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/791,312

(22) PCT Filed: Jan. 9, 2020

(86) PCT No.: PCT/KR2020/000427
§ 371 (c)(1),
(2) Date: Jul. 7, 2022

(87) PCT Pub. No.: WO2021/141164
PCT Pub. Date: Jul. 15, 2021

(65) Prior Publication Data
US 2023/0041589 A1    Feb. 9, 2023

(51) Int. Cl.
*H04N 21/422*    (2011.01)
(52) U.S. Cl.
CPC .............................. *H04N 21/42204* (2013.01)
(58) Field of Classification Search
None
See application file for complete search history.

(56) References Cited

U.S. PATENT DOCUMENTS

| | | | |
|---|---|---|---|
| 7,746,245 B2 | 6/2010 | Park et al. | |
| 8,918,544 B2 | 12/2014 | Chardon et al. | |
| 9,247,177 B2 | 1/2016 | Kim et al. | |
| 9,491,392 B2 | 11/2016 | Kim et al. | |
| 2006/0267741 A1 | 11/2006 | Park et al. | |
| 2008/0178224 A1* | 7/2008 | Laude | H04N 21/8186 725/44 |
| 2012/0249890 A1 | 10/2012 | Chardon et al. | |
| 2014/0313419 A1* | 10/2014 | Kim | H04N 21/43637 348/734 |
| 2014/0313420 A1 | 10/2014 | Kim et al. | |
| 2017/0026606 A1 | 1/2017 | Kim et al. | |
| 2018/0270440 A1 | 9/2018 | Kim et al. | |
| 2020/0128289 A1 | 4/2020 | Machida | |

FOREIGN PATENT DOCUMENTS

| | | |
|---|---|---|
| EP | 2 472 894 A1 | 7/2012 |
| JP | 2019-16881 A | 1/2019 |
| KR | 10-0630103 B1 | 9/2006 |
| KR | 10-2014-0126231 A | 10/2014 |
| KR | 10-1911379-81 | 10/2018 |
| WO | WO 2016/126609 A2 | 8/2016 |
| WO | WO 2019/182323 A1 | 9/2019 |

* cited by examiner

*Primary Examiner* — Samira Monshi
(74) *Attorney, Agent, or Firm* — Birch, Stewart, Kolasch & Birch, LLP

(57) ABSTRACT

A display device and a method for controlling same are disclosed. The display device compares device information of an external electronic device stored in the display device with device information transmitted by the external electronic device, thereby being capable of accurately recognizing a change in the external electronic device communicatively connected with the display device in a state in which the display device is turned off.

10 Claims, 8 Drawing Sheets

100

DISPLAY DEVICE AND METHOD FOR CONTROLLING SAME

CROSS REFERENCE TO RELATED APPLICATIONS

This application is the National Phase of PCT International Application No. PCT/KR2020/000427, filed on Jan. 9, 2020, all of which is hereby expressly incorporated by reference into the present application.

TECHNICAL FIELD

The present disclosure relates to a display device capable of preventing a malfunction of an integrated remote controller upon use thereof and a method of controlling the same.

BACKGROUND ART

A display device is a device having a function for providing an image which can be watched by a user. A user may watch broadcasting through the display device. The display device provides broadcasting selected by a user among broadcast signals transmitted by a broadcasting station. Such a broadcasting image is displayed on a display. TV is a representative example of the display device.

An operation of the display device is controlled by using a remote controller. In general, the remote controller controls the display device by using an infrared signal.

Meanwhile, the remote controller may be an integrated remote control device capable of controlling an external electronic device (e.g., a set-top box, a DVD player, or an external speaker) as well as the display device. Communication for the external electronic device with the display device is connected through wires (e.g., an HDMI connection) or wirelessly (e.g., ZigBee).

In order to control an external electronic device, setting for an operation of the remote controller is required. In general, in the state which communication between a turned-on display device and an external electronic device has been connected, setting for an operation of the remote controller is performed. If a communication between the display device and the external electronic device is disconnected, setting for an operation of the remote controller is released. For example, in the state in which an external electronic device has been plugged in a turned-on display device through an HDMI cable, setting for an operation of the remote controller is performed. When the external electronic device is unplugged from the display device, the setting for an operation of the remote controller is released.

Meanwhile, it is assumed that setting for an operation of the remote controller for an external electronic device A has been completed at a first time point at which a display device is turned on and the display device is turned off after the first time point. In this case, at the time point at which the display device is turned off, an external electronic device B instead of the external electronic device A may be connected to the display device. That is, an external electronic device connected to the display device may be changed at a time point at which the display device is turned off. If the display device is turned on again at a second time point, the remote controller cannot control the external electronic device B because an operation of the external electronic device A has been set.

That is, in the case of a conventional technology, logic for recognizing an external electronic device operates only when a display device is turned on. An external electronic device cannot be recognized when the display device is turned off. Accordingly, a user experiences inconvenience when using the display device.

DISCLOSURE

Technical Problem

An object of the present disclosure is to provide a display device capable of preventing a malfunction of an integrated remote controller upon use thereof and a method of controlling the same.

An object of the present disclosure is to provide a display device capable of accurately recognizing an external electronic device when the external electronic device is newly connected in a situation in which the display device has been turned off, and a method of controlling the same.

Objects of the present disclosure are not limited to the aforementioned objects, and other objects and advantages of the present disclosure not described above may be understood from the following description and evidently understood based on embodiments of the present disclosure. Furthermore, it may be easily seen that the objects and advantages of the present disclosure can be realized by means written in the claims and a combination thereof

Technical Solution

A display device according to an embodiment of the present disclosure can accurately recognize a change of an external electronic device for which communication with a display device has been connected in a situation in which the display device has been turned off by comparing device information of the external electronic device stored in the display device and device information transmitted by the external electronic device.

More specifically, a display device according to an embodiment of the present disclosure includes a first communication unit, a database configured to store device information of an external electronic device for which communication with the first communication unit has been connected, a memory configured to store at least one instruction, and a processor configured to execute the at least one instruction. The processor determines whether the external electronic device has been changed at a second time point on the basis of device information stored in the database at a first time point and device information of the external electronic device at the second time point, and performs an operation of resetting a remote controller that remotely controls both the display device and the external electronic device if the external electronic device has been changed at the second time point.

A method of controlling a display device according to an embodiment of the present disclosure includes reading out, by a processor, device information of an external electronic device at a first time point, which is stored in a database, at a second time point, determining, by the processor, whether the external electronic device has been changed at the second time point on the basis of the device information of the external electronic device at the first time point and device information of the external electronic device for which communication with a first communication unit has been connected at the second time point, and performing, by the processor, an operation of resetting a remote controller that remotely controls both the display device and the external electronic device if the external electronic device has been changed at the second time point.

Advantageous Effects

According to the present disclosure, a malfunction can be prevented upon use of an integrated remote controller.

Furthermore, according to the present disclosure, when an external electronic device is newly connected in a situation in which a display device has been turned off, the external electronic device can be accurately recognized.

Detailed effects of the present disclosure along with the aforementioned effects are described while detailed contents for implementing the disclosure are described hereinafter.

MODE FOR INVENTION

Figure 1:
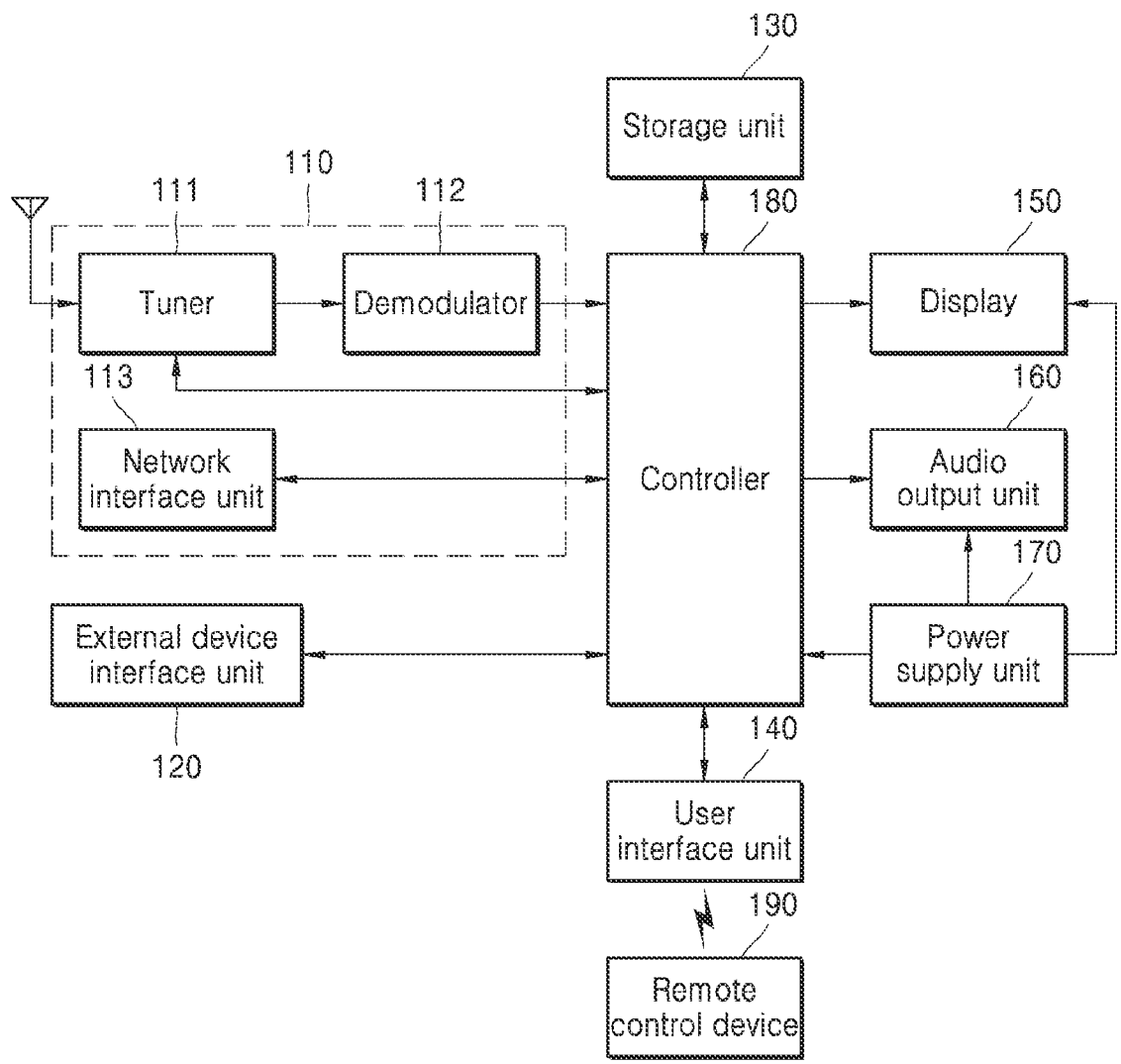
FIG. 1 is a diagram illustrating a schematic configuration of a digital device according to an embodiment of the present disclosure.

The aforementioned objects, characteristics, and merits are described below in detail with reference to the accompanying drawings, and thus a person having ordinary knowledge in the art to which the present disclosure pertains may readily practice the technical spirit of the present disclosure. Furthermore, in describing the present disclosure, a detailed description of a known art related to the present disclosure will be omitted if it is deemed to make the subject matter of the present disclosure unnecessarily vague. Hereinafter, embodiments according to the present disclosure are described in detail with reference to the accompanying drawings. In the drawings, the same reference numerals are used to denote the same or similar elements.

Although a "first", a "second", etc. are used to describe various elements, these elements are not limited by these terms. These terms are merely used to distinguish between one element and another element, and a first element may be a second element unless specially described to the contrary.

Furthermore, when it is said that one element is "connected", "combined", or "coupled" to another element, it should be understood that the elements may be directly connected or coupled, but another element may be "interposed" between the elements or the elements may be "connected", "combined", or "coupled" through another element.

In the entire specification, each element may be singular or plural unless specially described otherwise.

An expression of the singular number used in this specification includes an expression of the plural number unless clearly defined otherwise in the context. In this specification, terms, such as "include" and "comprise", should not be construed as essentially including all various elements or various steps described in the specification, but the terms should be construed as not including some of the elements or steps or as including additional elements or steps.

In the entire specification, "A and/or B" means A, B, or A and B unless specially described to the contrary. "C to D" means C or higher and D or less unless specially described to the contrary.

Meanwhile, a display device described in this specification is an intelligent display device in which a computer support function has been added to a broadcasting reception function, for example, and may be equipped with an interface that is convenient for use, such as an input device using a handwriting method, a touch screen, or a space remote controller, due to the addition of an Internet function, etc. as well as a faithful broadcasting reception function. Furthermore, the display device may be connected to the Internet and a computer with the support of a wired or wireless Internet function, and may also perform a function, such as e-mail, web browsing, banking, or game. For such various functions, a standardized general-purpose OS may be used.

Accordingly, the display device described in this specification may perform various user-friendly functions because various applications can be freely added onto or deleted from a general-purpose OS kernel, for example. More specifically, the display device may be a network display device, an HBB display device, a smart display device, an LED display device, or an OLED display device, for example, and may also be applied to a mobile terminal in some cases.

Examples of the mobile terminal described in this specification may include a mobile phone, a smart phone, a laptop computer, a terminal for digital broadcasting, personal digital assistants (PDA), a portable multimedia player (PMP), navigation, a slate PC, a tablet PC, an ultrabook, and wearable devices (e.g., a smartwatch, smart glasses, and a head mounted display (HMD)).

However, those skilled in the art may easily understand that a construction according to an embodiment described in this specification may also be applied to stationary terminals, such as a digital display device, a desktop computer, and digital signage, except a case where the construction can be applied to only the mobile terminal.

Hereinafter, a display device and a method of controlling the same according to some embodiments of the present disclosure are described.

FIG. 1 is a diagram illustrating a schematic configuration of a digital device according to an embodiment of the present disclosure.

Referring to FIG. 1, a digital device 100 may include a broadcast receiver 110, an external device interface unit 120, a storage unit 130, a user interface unit 140, a display 150, an audio output unit 160, a power supply unit 170, and a controller 180.

In this case, the broadcast receiver 110 may include a tuner 111, a demodulator 112, and a network interface unit 113. However, in some cases, the broadcast receiver 110 may include the tuner 111 and the demodulator 112, but may not include the network interface unit 113, and vice versa.

Furthermore, the broadcast receiver 110 may include a multiplexer although not illustrated. In this case, the multiplexer may multiplex a signal that is demodulated by the demodulator 112 and a signal that is received through the network interface unit 113. In addition, the broadcast receiver 110 may also include a demultiplexer although not illustrated. The demultiplexer may demultiplex a multiplexed signal or may demultiplex a signal that is demodulated by the demodulator 112 or a signal that is received through the network interface unit 113.

The tuner 111 tunes a specific radio frequency (RF) broadcast signal. The specific RF broadcast signal corresponds to a channel selected by a user or all of previously stored channels. Furthermore, the tuner 111 converts the RF broadcast signal into an intermediate frequency (IF) signal or a baseband signal.

For example, the tuner 111 converts an RF broadcast signal, that is, a digital broadcast signal, into a digital IF (DIF) signal, and converts an RF broadcast signal, that is, an analog broadcast signal, into an analog baseband image or a voice signal (CVBS/SIF). That is, the tuner 111 may process both a digital broadcast signal and an analog broadcast signal. The analog baseband image or the voice signal (CVBS/SIF) output by the tuner 111 may be directly input to the controller 180.

Furthermore, the tuner 111 may receive an RF broadcast signal of a single carrier or multiple carriers. Meanwhile, the tuner 111 may sequentially tune and receive RF broadcast signals of all broadcasting channels that are stored through a channel memory function, and may convert the RF broadcast signals into an IF signal or a baseband signal.

The demodulator 112 may receive a digital IF signal converted by the tuner 111, may demodulate the received digital IF signal, and may perform channel decoding, etc. To this end, the demodulator 112 may include a Trellis decoder, a de-interleaver, a Reed-Solomon decoder, etc. or may include a convolution decoder, a de-interleaver, a Reed-Solomon decoder, etc.

The demodulator 112 may perform demodulation and channel decoding and then output a stream signal TS. In this case, the stream signal may be a signal in which an image signal, a voice signal or a data signal are multiplexed. For example, the stream signal may be an MPEG-2 transport stream (TS) in which an image signal having the MPEG-2 standard, a voice signal having the Dolby AC-3 standard, etc. are multiplexed.

The stream signal output by the demodulator 112 may be input to the controller 180. The controller 180 may control demultiplexing, image/voice signal processing, etc., and may control the output of an image through the display 150 and the output of a voice through the audio output unit 160.

The external device interface unit 120 provides an interfacing environment between the digital device 100 and various external devices.

The external device interface unit 120 may be connected to an external device, such as a digital versatile disk (DVD), Blu-ray, a game device, a camera, a camcorder, a computer (laptop), a tablet PC, a smartphone, a Bluetooth device, or a cloud, in a wired/wireless way. The external device interface unit 120 delivers, to the controller 180, a signal including data, such as an image, a video, or voice that is received through the connected external device. The controller 180 may control a processed data signal, such as an image, a video, or voice, to be output to the connected external device. To this end, the external device interface unit 120 may further include an A/V input/output unit (not illustrated) or a wireless communication unit (not illustrated).

The A/V input/output unit may include a USB terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc. so that an image and voice signal of an external device can be input to the digital device 100.

The wireless communication unit may perform short-distance wireless communication with another digital device. The digital device 100 may be connected to another digital device over a network according to a communication protocol, such as Bluetooth, radio frequency identification (RFID), infrared data association (IrDA), an ultra wideband (UWB), ZigBee, or a digital living network alliance (DLNA), for example.

Furthermore, the external device interface unit 120 may be connected to a set-top box STB through at least one of the aforementioned various terminals, and may perform an input/output operation along with the set-top box STB.

Meanwhile, the external device interface unit 120 may receive an application or an application list within an adjacent external device, and may deliver the application or the application list to the controller 180 or the storage unit 130.

The network interface unit 113 provides an interface for connecting the digital device 100 to a wired/wireless network. The network interface unit 113 may include an Ethernet terminal, etc. for a connection with the wired network, and may use a communication standard, such as a wireless LAN (WLAN), Wi-Fi, a wireless broadband (Wibro), world interoperability for microwave access (Wimax), or high speed downlink packet access (HSDPA), for a connection with the wireless network.

The network interface unit 113 may transmit and receive data to and from another digital device over a connected network or another network linked to the connected network. In particular, the network interface unit 113 may transmit some content data stored in the digital device 100 to a digital device that is selected among other digital devices that have been previously registered.

Meanwhile, the network interface unit 113 may access a prescribed web page over a connected network or another network linked to the connected network. That is, the network interface unit 113 may access a prescribed web page over a network, and may transmit or receive data to or from a corresponding server. In addition, the network interface unit 113 may receive content or data that is provided by a content provider or a network operator. That is, the network interface unit 113 may receive content, such as a movie, 광고, game, a VOD, or a broadcast signal that is provided by a content provider or a network provider, or information related thereto over a network. Furthermore, the network interface unit 113 may receive update information and an update file of firmware that is provided by a network operator. Furthermore, the network interface unit 113 may transmit data to the Internet, a content provider, or a network operator.

The network interface unit 113 may receive a desired application by selecting the desired application among applications that are open over a network.

The storage unit 130 may store a program for each piece of signal processing and control within the controller 180, and may store a signal-processed image, voice, or data signal.

The storage unit 130 may temporarily store an image, voice, or, a data signal that is received from the external device interface unit 120 or the network interface unit 113. The storage unit 130 may store information about a prescribed broadcasting channel through the channel memory function.

The storage unit 130 may store an application or an application list that is received from the external device interface unit 120 or the network interface unit 330.

The storage unit 130 may also store various platforms that are described later.

The storage unit 130 may include a storage medium having at least one type among a flash memory type, a hard disk type, a multimedia card micro type, a card type memory (e.g., an SD or XD memory), a RAM, and an EEPROM, for example. The digital device 100 may provide a user with a content file (a moving image file, a still image file, a music file, a document file, or an application file) that has been stored in the storage unit 130 by playing back the content file.

Meanwhile, the storage unit 130 may be included in the controller 180, and may be provided separately from the controller 180.

The user input interface unit 140 may deliver, to the controller 180, a signal input by a user or may deliver a signal of the controller 180 to a user.

For example, the user input interface unit 140 may be connected to a remote control device 190 according to various communication methods, such as an RF communication method and an infrared (IR) communication method, may receive a control signal, such as power on/off, channel selection, or screen setting transmitted by the remote control device 190 and process the control signal, or may transmit a control signal of the controller 180 to the remote control device 500. Furthermore, the user input interface unit 140 may deliver, to the controller 180, a control signal that is received from a local key (not illustrated), such as a power key, a channel key, a volume key, or a set key.

The user input interface unit 140 may deliver, to the controller 180, a control signal received from a sensing unit (not illustrated) that senses a gesture of a user or may transmit a signal of the controller 180 to the sensing unit (not illustrated). In this case, the sensing unit (not illustrated) may include a touch sensor, a voice sensor, a position sensor, an operation sensor, etc.

The controller 180 may generate and output a signal for an image or voice output by demultiplexing a stream that is received through the tuner 111, the demodulator 112, or the external device interface unit 120 or processing demultiplexed signals.

An image signal processed by the controller 180 may be input to the display 150, and may be displayed as an image corresponding to the corresponding image signal. Furthermore, an image signal image-processed by the controller 180 may be input to an external output device through the external device interface unit 120.

A voice signal processed by the controller 180 may be output to the audio output unit 160 in an audio form. Furthermore, a voice signal processed by the controller 180 may be input to an external output device through the external device interface unit 120.

Meanwhile, the controller 180 may include a demultiplexer, an image processor, etc.

The controller 180 may control an overall operation of the digital device 100. For example, the controller 180 may control the tuner 111 to tune RF broadcasting that corresponds to a channel selected by a user or a previously stored channel.

The controller 180 may control the digital device 100 by a user command that is received through the user input interface unit 140 or an internal program. In particular, the controller 180 may access a network and download, to the digital device 100, an application or application list that is desired by a user.

For example, the controller 180 controls the tuner 111 to receive a signal of a selected channel in response to a prescribed channel selection command that is received through the user input interface unit 140. Furthermore, the controller 180 processes an image, voice, or a data signal of the selected channel. The controller 180 controls to output information on a channel selected by a user, etc. through the display 150 or the audio output unit 160 along with a processed image or voice signal.

Furthermore, for example, the controller 180 controls to output an image signal or voice signal from an external device through the display 150 or the audio output unit 160 in response to an external device image playback command that is received through the user input interface unit 140.

Meanwhile, the controller 180 may control the display 150 to display an image. For example, the controller 180 may control the display 150 to display a broadcasting image received through the tuner 111, an external input image received through the external device interface unit 120, an image received through the network interface unit, or an image stored in the storage unit 130. In this case, the image displayed on the display 150 may be a still image or a moving image, and may be a 2D image or a 3D image.

Furthermore, the controller 180 may control the display 150 to play back content. In this case, the content may be content that is stored in the digital device 100, received broadcasting content, or external input content that is received from the outside. The content may be at least one of a broadcasting image, an external input image, an audio file, a still image, an accessed web screen, and a document file.

Meanwhile, when entering an application view item, the controller 180 may control to display an application or an application list within the digital device 100 or which may be downloaded from an external network .

The controller 180 may control to install and drive an application that is downloaded from an external network along with various user interfaces. Furthermore, the controller 180 may control the display 150 to display an image that is executed by the selection of a user and that is related to an application.

Meanwhile, although not illustrated in the drawing, a channel browsing processor which generates a thumbnail image corresponding to a channel signal or an external input signal may be further included.

The channel browsing processor may receive a stream signal TS output by the demodulator 320, a stream signal output by the external device interface unit 120, etc., and may generate a thumbnail image by extracting an image from the received stream signal. The generated thumbnail image may be input to the controller 180 without any change or after being coded. Furthermore, the generated thumbnail image may be coded in a stream form and input to the controller 180. The controller 180 may display, on the display 150, a thumbnail list including a plurality of thumbnail images by using a received thumbnail image. Meanwhile, the thumbnail images within the thumbnail list may be sequentially or simultaneously updated. Accordingly, a user can conveniently check the contents of a plurality of broadcasting channels.

The display 150 generates a driving signal by converting an image signal, a data signal, or an OSD signal processed by the controller 180 or an image signal, a data signal, etc. received from the external device interface unit 120 into R, G, B signals.

The display 150 may be a PDP display, an LCD display, an OLED display, a flexible display, a 3D display, etc.

Meanwhile, the display 150 may be constructed as a touch screen and may also be used as an input device in addition to an output device.

The audio output unit 160 receives a signal voice-processed by the controller 180, for example, a stereo signal, a 3.1 channel signal, or a 5.1 channel signal, and outputs the received signal as a voice. The audio output unit 160 may be implemented as speakers having various forms.

Meanwhile, in order to sense a gesture of a user, as described above, the sensing unit (not illustrated) including at least one of a touch sensor, a voice sensor, a position sensor, and an operation sensor may be further included in the digital device 100. A signal sensed by the sensing unit (not illustrated) may be delivered to the controller 3180 through the user input interface unit 140.

Meanwhile, a photographing unit (not illustrated) that photographs a user may be further included. Information on an image photographed by the photographing unit (not illustrated) may be input to the controller 180.

The controller 180 may sense a gesture of a user based on each of an image photographed by the photographing unit (not illustrated) and a signal sensed by the sensing unit (not illustrated) or by combining the image and the signal.

The power supply unit 170 supplies power to the elements of the digital device 100. In particular, the power supply unit 170 may supply power to the controller 180 which may be implemented in the form of a system on chip (SoC), the display 150 for image display, and the audio output unit 160 for an audio output.

To this end, the power supply unit 170 may include a converter (not illustrated) which converts AC power into DC power. Meanwhile, if the display 150 is implemented as a liquid crystal panel including multiple backlight lamps, for brightness variation or dimming driving, the power supply unit 170 may further include an inverter (not illustrated) capable of a pulse width modulation (PWM) operation.

The digital device 100 may be a digital broadcasting receiver capable of processing a digital broadcast signal using a stationary or mobile ATSC method or a DVB method.

In addition, the digital device 100 may omit some of the illustrated elements or may further include an element that has not been illustrated, if necessary. Meanwhile, unlike the above-described construction, the digital device 100 may not include the tuner and the demodulator, and may receive content through the network interface unit or the external device interface unit and play back the content.

Meanwhile, a display device, such as smart TV, among the digital devices 100 may be an intelligent device in which a computer support function has been added to a broadcasting reception function. Accordingly, the display device, such as smart TV, may include a plurality of software programs (e.g., applications) like a smartphone, and may execute various operations which are performed in the plurality of software programs, respectively.

Hereinafter, a display device and a method of controlling the same according to an embodiment of the present disclosure are described with reference to the aforementioned contents.

Figure 2:
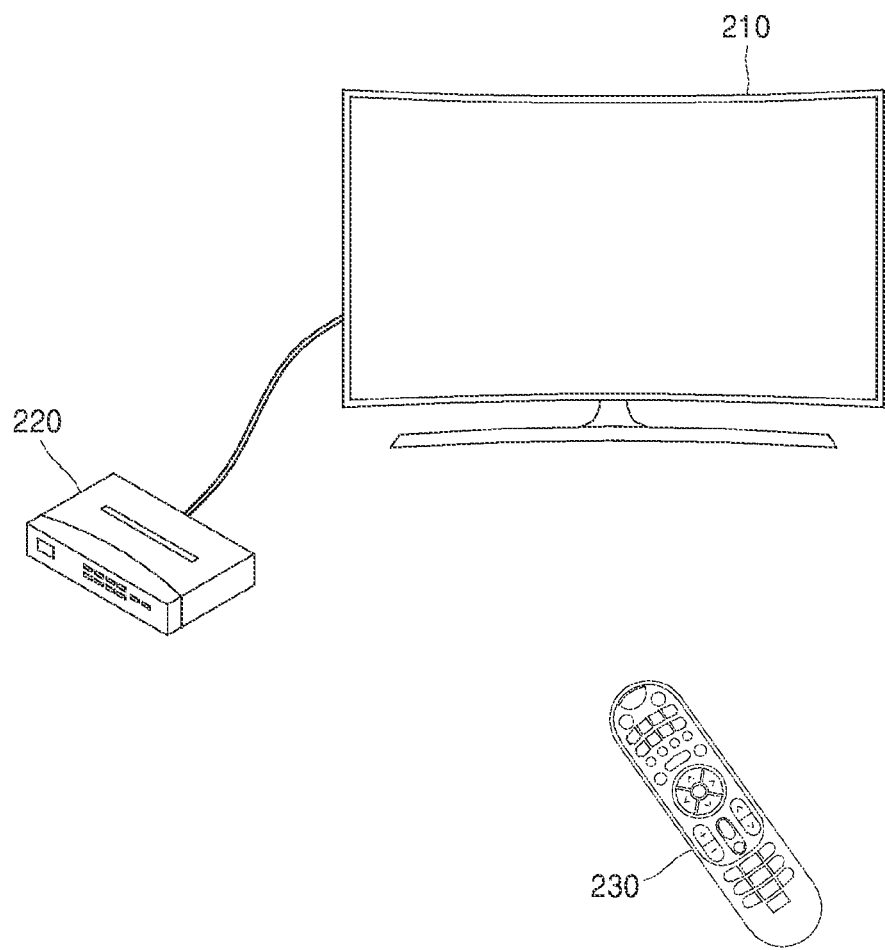
FIG. 2 is a diagram illustrating a schematic configuration of a network system according to an embodiment of the present disclosure.

FIG. 2 is a diagram illustrating a schematic configuration of a network system according to an embodiment of the present disclosure.

A network system 200 according to FIG. 2 may be a small-sized network system which is present at home, etc., and includes a display device 210, an external electronic device 220, and a remote controller 230.

The display device 210 may be TV, for example, and provides a user with various services through a plurality of software programs. More detailed elements of the display device 210 are described later.

The external electronic device 220 provides various services while operating in conjunction with the display device 210.

For example, the external electronic device 220 may be a set-top box, a DVD player, an external speaker, etc. The set-top box is a device that provides the display device 210 with a bidirectional service or a video on demand (VOD) service. The DVD player is a device that plays back a DVD medium while operating in conjunction with the display device 210. The external speaker is a device that outputs an audio signal of a moving image executed by the display device 210.

Meanwhile, communication for the external electronic device with the display device 210 may be connected through a wired communication method (e.g., an HDMI communication method) or a wireless communication method (e.g., a ZigBee communication method).

Furthermore, the external electronic device 220 may transmit device information of the external electronic device 220 to the display device 210, and may not transmit the device information. This is more specifically described below.

The remote controller 230 is a device capable of remotely controlling both the display device 210 and the external electronic device 220. That is, the display device 210 and the external electronic device 220 are controlled through one remote controller 230. In order to control the external electronic device 220, setting for an operation of the remote controller 230 is required.

Meanwhile, the external electronic device 220 connected to the display device 210 may be changed from an external electronic device A to an external electronic device B.

For example, a set-top box A has been plugged in an HDMI port A of the display device 210 through an HDMI cable. At a specific time point, the set-top box A may be unplugged from the HDMI port A, and a set-top box B may be plugged in the HDMI port A through the HDMI cable.

In this case, according to the present disclosure, in a situation in which the display device 210 is turned off, a change of the external electronic device 220 may be recognized. In the present disclosure, a change of the external electronic device 220 may be recognized even in a situation in which the display device 210 is turned on. In the case of a situation in which the display device 210 is turned on, a change of the external electronic device 220 may be recognized according to a conventional technology.

Hereinafter, an embodiment of the present disclosure in which a change of the external electronic device 220 is recognized in a situation in which the display device 210 is turned off is more specifically described.

Figure 3:
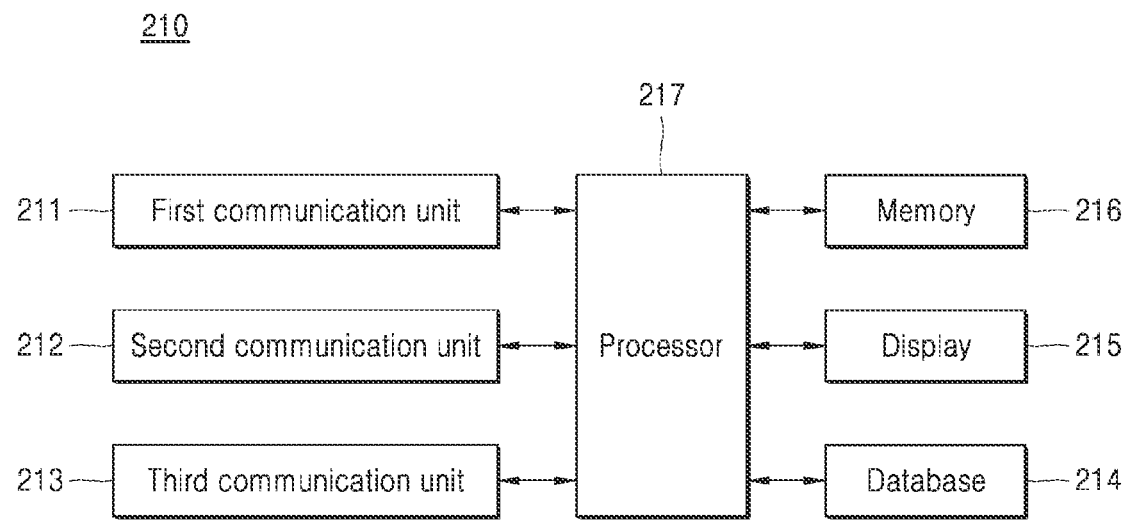
FIG. 3 is a diagram illustrating a schematic configuration of a display device according to an embodiment of the present disclosure.

FIG. 3 is a diagram illustrating a schematic configuration of the display device 210 according to an embodiment of the present disclosure.

Referring to FIG. 3, the display device 210 includes a first communication unit 211, a second communication unit 212, a third communication unit 213, a database 214, a display 215, a memory 216, and a processor 217.

Hereinafter, functions of the elements for each element are specifically described.

The first communication unit 211 is a communication unit for a communication connection with the external electronic device 220. In this case, when the display device 210 is turned on, communication between the first communication unit 211 and the external electronic device 220 is connected.

Communication for the first communication unit 211 with the external electronic device 220 may be connected through a wired communication method or a wireless communication method.

In this case, the wired communication method may be a communication method through a cable. For example, the first communication unit 211 corresponds to an HDMI port, the external electronic device 220 includes an HDMI port, and the first communication unit 211 and the HDMI port of the external electronic device 220 may be connected through an HDMI cable.

Furthermore, the wireless communication method may be a communication method using short-distance wireless communication. For example, the short-distance wireless communication may include at least one of technologies, such as Bluetooth, radio frequency identification (RFID), infrared data association (IrDA), an ultra wideband (UWB), ZigBee, near field communication (NFC), wireless-fidelity (Wi-Fi), Wi-Fi Direct, and a wireless universal serial bus (USB).

Meanwhile, one or more first communication units 211 may be provided. For example, the display device 210 may include at least one HDMI port. Meanwhile, for convenience of description, it is assumed that one first communication unit 211 is included in the display device 210, but the present disclosure is not limited thereto. In this case, contents described hereinafter may also be applied to the display device 210 including at least one first communication unit 211.

The second communication unit 212 is a communication unit for a communication connection with external servers. In this case, the second communication unit 212 may include a long-distance communication module, a short-distance communication module, etc.

In this case, the external servers include a first external server and a second external server. Meanwhile, the first external server and the second external server may be integrated into one external server.

The first external server is a server that matches and stores identification information of a plurality of external electronic devices 220 and remote controller setting information of the plurality of external electronic devices 220.

In this case, the identification information is information for identifying the external electronic device 220. For example, the identification information may include at least one of vendor information, model information, and electronic device type information (e.g., a set-top box or an external speaker) of the external electronic device 220. The remote controller setting information means setup information that is used for the remote controller 230 to control the external electronic device 220.

Furthermore, the second external server is a server for searching for identification information of the external electronic device 220 described hereinafter. The second external server may be separately included for each area (e.g., a city).

The third communication unit 213 is a communication unit for performing communication with the remote controller 230. For example, communication for the third communication unit 213 with the remote controller 230 is connected through an IR communication method or a Bluetooth communication method.

The database 214 stores device information of the external electronic device 220 for which communication with the first communication unit 211 is connected. That is, the database 214 stores device information of the external electronic device 220 for which communication with the first communication unit 211 has recently been connected.

In this case, the device information may be identification information of the external electronic device 220. Meanwhile, if identification information of the external electronic device 220 cannot be known, the device information may be NULL information.

That is, the device information may be transmitted or may not be transmitted to the first communication unit 211 depending on the type of external electronic device 220. If the external electronic device 220 transmits the device information, the device information stored in the database 214 may have a specific value. If the external electronic device 220 does not transmit the device information, the device information stored in the database 214 may have a NULL value.

Meanwhile, the device information of the external electronic device 220 may be included in a packet signal that is transmitted when the external electronic device 220 provides a specific service, and may be transmitted through HDMI source data product descriptor (SDP) information, a ZigBee packet, etc.

Furthermore, the database 214 may match and store identification information and remote controller setting information of at least one external electronic device for which communication with the first communication unit 211 had been previously connected.

Meanwhile, for convenience of description, the external electronic device for which communication with the first communication unit 211 had been previously connected is called a "first external electronic device."

The display 215 may consist of an LCD, an LED, an OLED, etc., and performs a function for displaying an image and a moving image with respect to a user.

The memory 216 may be a volatile and/or nonvolatile memory, and stores an instruction or data that is related to at least another element of the display device 210.

The processor 217 may include one or more of a central processing unit, an application processor, or a communication processor. The processor 217 may execute an operation or data processing relating to control and/or communication of at least another element of the display device 210, and may execute the instruction.

Figure 4:
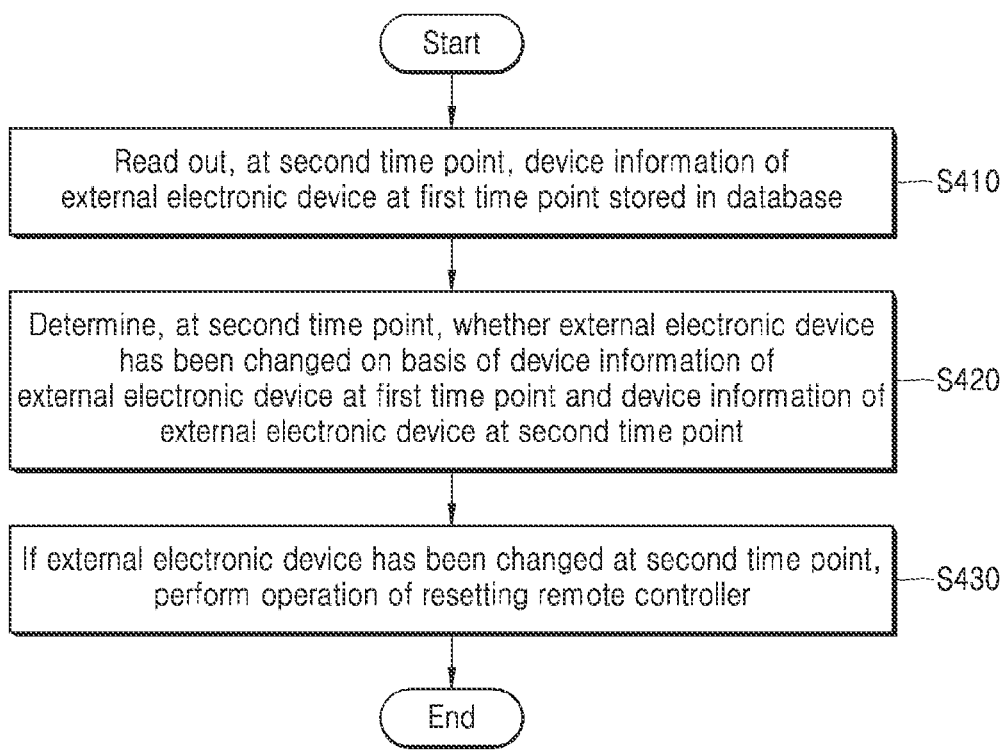
FIG. 4 is a diagram illustrating a flowchart of a method of controlling the display device according to an embodiment of the present disclosure.

FIG. 4 is a diagram illustrating a flowchart of a method of controlling the display device 210 according to an embodiment of the present disclosure.

Meanwhile, it is assumed that the display device 210 has been turned on at a second time point (i.e., at a current time point). Furthermore, it is assumed that device information of the external electronic device 220 for which communication with the first communication unit 211 has recently been connected has been stored in the database 214. That is, it is assumed that the device information of the external electronic device 220 for which communication with the first communication unit 211 has been connected at a time point at which the display device 210 is turned on right before the second time point, that is, at a first time point, has been stored in the database 214. Furthermore, it is assumed that identification information of a first external electronic device for which communication with the first communication unit 211 had been previously connected and remote controller setting information corresponding to the identification information have been stored in the database 214.

Hereinafter, a process of performing each of steps is specifically described with reference to FIG. 4.

In step S410, the processor 217 reads out the device information of the external electronic device 220 at the first time point, which was stored in the database 214, at the second time point.

In step S420, the processor 217 determines whether the external electronic device 220 has been changed at the second time point, on the basis of the device information of the external electronic device at the first time point and the device information of the external electronic device 220 for which communication with the first communication unit 211 has been connected at the second time point.

Figure 5:
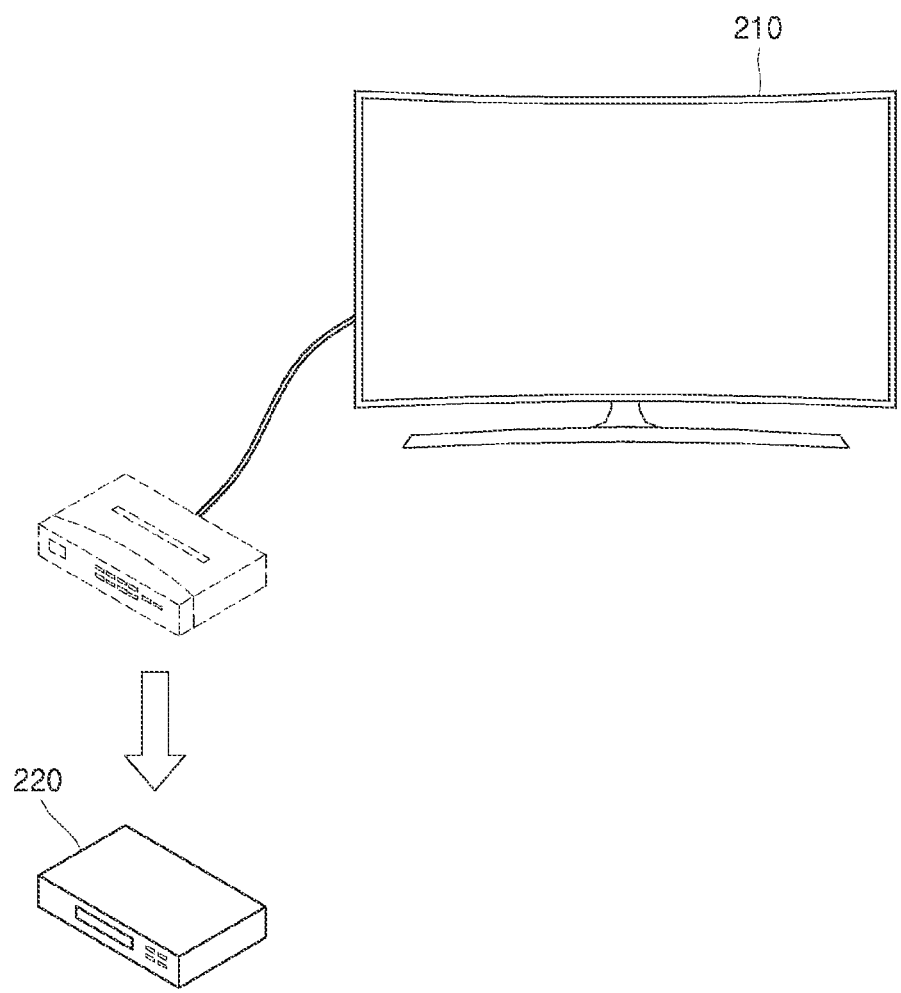
FIG. 5 is a diagram illustrating a situation in which an external electronic device is changed according to an embodiment of the present disclosure.

That is, the first time point is a time point at which the display device 210 has been turned on. The second time point is a time point at which the display device 210 has been turned on right after the first time point. The display device 210 is turned off in the time interval between the first time point and the second time point. In this case, step S420 is a step of confirming whether the external electronic device 220 connected to the first communication unit 211 has been changed from an external electronic device A to an external electronic device B in the time interval between the first time point and the second time point. This has been illustrated in FIG. 5.

In step S430, if the external electronic device 220 has been changed at the second time point, the processor 217 performs an operation of resetting the remote controller 230 that remotely controls both the display device 210 and the external electronic device 220.

Hereinafter, whether the external electronic device 220 has been changed and a resultant operation of setting the remote controller 230 are specifically described for each situation.

1) First Situation

The first situation is a situation in which device information stored in the database 214 is NULL information and the external electronic device 220 transmits, to the display device 210, device information including second identification information.

That is, the first situation means a situation in which communication for the external electronic device 220 with the first communication unit 211 has been connected at a first time point and the external electronic device 220 has provided a service at the first time point, but only device information has not been present at the first time point and thereafter, device information of the external electronic device 220, that is, second identification information, is received at a second time point.

Meanwhile, when providing a specific service, the external electronic device 220 may transmit a specific signal (e.g., an image packet signal when providing an image providing service). The processor 217 may determine whether device information has been transmitted when the specific signal is transmitted.

In this case, the processor 217 compares the device information stored at the first time point and the device information received at the second time point.

In this case, since the device information stored at the first time point is NULL information and the device information received at the second time point is the second identification information, the processor 217 determines that the device information stored at the first time point and the device information received at the second time point are different from each other. That is, the processor 217 determines that the external electronic device 220 has been changed in the time interval between the first time point and the second time point.

Thereafter, the processor 217 performs an operation of resetting the remote controller 230 at the second time point. That is, the processor 217 releases the existing setting for an operation of the remote controller 230, and performs setting for an operation of the remote controller 230 for the newly connected external electronic device 220.

Figure 6:
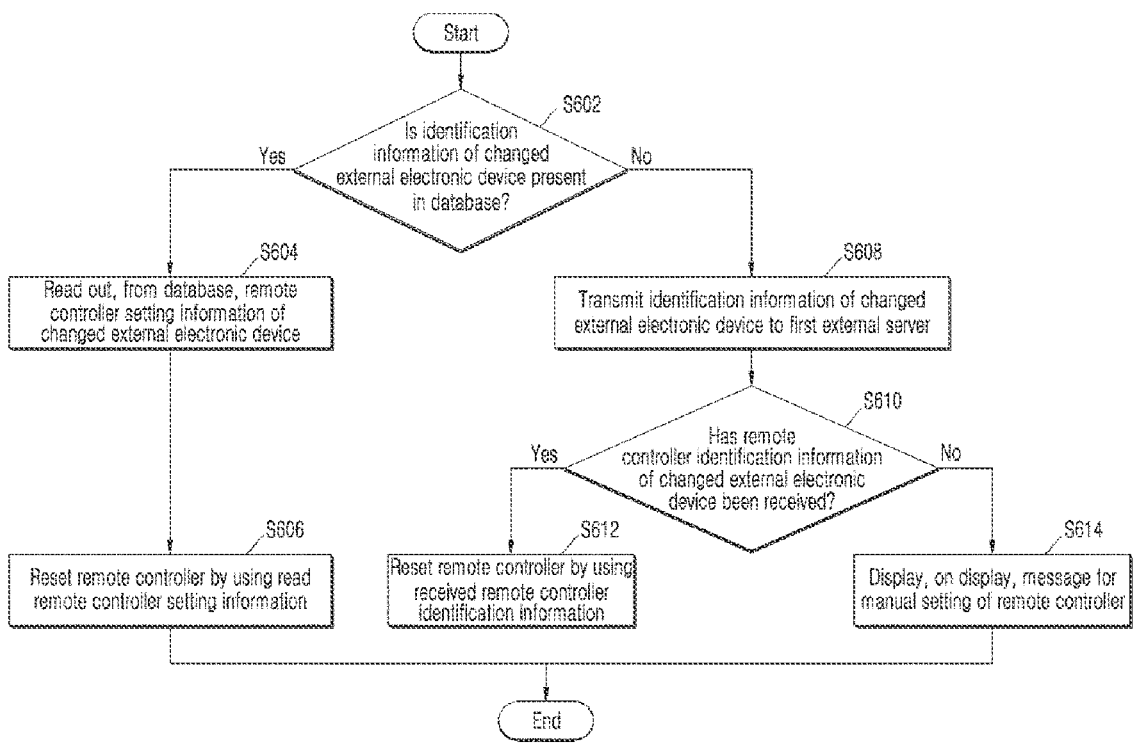
FIGS. 6 and 7 are diagrams illustrating flowcharts of an operation of resetting a remote controller according to an embodiment of the present disclosure.

FIG. 6 is a diagram illustrating a flowchart of an operation of resetting the remote controller 230 according to an embodiment of the present disclosure.

In step S602, the processor 217 searches whether the same identification information as the identification information of the changed external electronic device 220 is present in the database 214.

When the identification information of the changed external electronic device 220 is present in the database 214, in step S604, the processor 217 reads out, from the database 214, remote controller setting information that is matched with the identification information of the changed external electronic device 220. Furthermore, in step S606, the processor 217 resets the remote controller 230 by using the read remote controller setting information.

That is, if the changed external electronic device 220 has been previously connected to the first communication unit 211 and remote controller setting information thereof has been stored in the database 214, the processor 217 resets the remote controller 230 by using the previous remote controller setting information of the external electronic device 220. Accordingly, the remote controller 230 can be rapidly reset.

In contrast, when the identification information of the changed external electronic device 220 is not present in the database 214, in step S608, the second communication unit 212 transmits the identification information of the changed external electronic device 220 to a first external server.

Furthermore, in step S610, the processor 217 determines whether remote controller identification information of the changed external electronic device 220 has been received from the first external server through the second communication unit 212.

When the remote controller identification information of the changed external electronic device 220 is received, in step S612, the processor 217 resets the remote controller 230 by using the received remote controller identification information.

That is, if the changed external electronic device 220 has not been previously connected to the first communication unit 211, the processor 217 may receive remote controller setting information of the changed external electronic device 220 from the first external server through the second communication unit 212. The processor 217 resets the remote controller 230 by using the received remote controller setting information of the external electronic device 220.

If the remote controller setting information of the external electronic device 220 has not been stored even in the first external server, in step S612, the processor 217 displays, on the display 215, a message for manual setting of the remote controller 230. In this case, a user may reset the remote controller 230 with reference to a manual book of the display device 210.

Meanwhile, the identification information of the changed external electronic device 220 and the remote controller setting information matched with the identification information are stored in the database 214. That is, the processor 217 deletes, from the database 214, the device information stored at the first time point, and stores, in the database, the device information received at the second time point. Furthermore, if the remote controller setting information of the changed external electronic device 220 has not been stored in the database 214, the processor 217 matches and stores the identification information of the changed external electronic device 220 and the remote controller setting information in the database 214.

2) Second Situation

The second situation is a situation in which device information stored in the database 214 is first identification information and the external electronic device 220 transmits, to the display device 210, device information including second identification information. In this case, the first identification information is identification information different from the second identification information.

That is, the second situation means a situation in which communication for the external electronic device 220 with the first communication unit 211 is connected at a first time point, first identification information of the external electronic device 220 is stored in the database 214 at the first time point, and thereafter device information of the external electronic device 220, that is, second identification information, is received at a second time point.

In this case, the processor 217 compares the device information stored at the first time point and the device information received at the second time point.

In this case, since the device information stored at the first time point is the first identification information and the device information received at the second time point is the second identification information, the processor 217 determines that the device information stored at the first time point and the device information received at the second time point are different from each other. That is, the processor 217 determines that the external electronic device 220 has been changed in the time interval between the first time point and the second time point.

For example, if the first identification information is "a set-top box with a model name x101 released by a company x" and the second identification information is "a set-top box with a model name y202 released by a company y", the processor 217 determines that the first identification information is different from the second identification information.

Thereafter, the processor 217 performs an operation of resetting the remote controller 230 at the second time point. That is, the processor 217 releases the existing setting for an operation of the remote controller 230, and performs setting for an operation of the remote controller 230 for the newly connected external electronic device 220.

The operation of resetting the remote controller 230 at the second time point is similar to the aforementioned contents in FIG. 6, and a description thereof is omitted. Furthermore, the identification information of the changed external electronic device 220 and remote controller setting information matched with the identification information are stored in the database 214.

3) Third Situation

The third situation is a situation in which device information stored in the database 214 is first identification information and the external electronic device 220 does not transmit device information to the display device 210.

That is, communication for some external electronic devices 220 with the first communication unit 211 is connected, and the some external electronic devices 220 transmit a packet signal for providing a specific service, but may not transmit device information. That is, device information of the external electronic device 220 at a second time point corresponds to NULL information.

In this case, the processor 217 compares device information stored at a first time point and device information received at a second time point.

In this case, since the device information stored at the first time point is the first identification information and the device information of the external electronic device 220 at the second time point is NULL information, the processor 217 determines that the device information stored at the first time point and the device information received at the second time point are different from each other. That is, the processor 217 determines that the external electronic device 220 has been changed in the time interval between the first time point and the second time point.

Meanwhile, the processor 217 cannot know the identification information of the changed external electronic device 220. Accordingly, the processor 217 finalizes the identification information of the changed external electronic device 220 and then performs an operation of resetting the remote controller 230 at the second time point.

Figure 7:
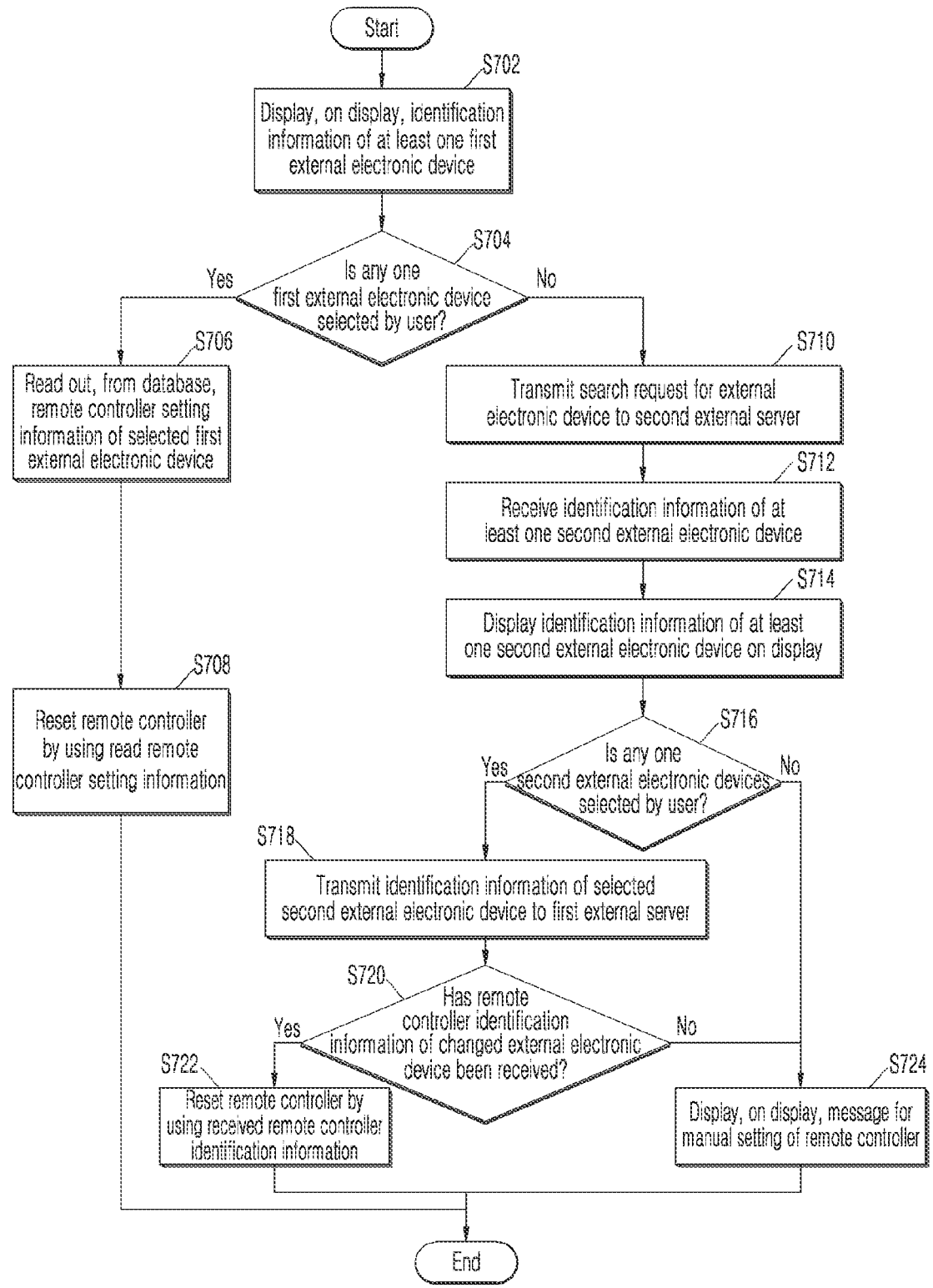

FIG. 7 is a diagram illustrating a flowchart of an operation of resetting the remote controller 230 according to a second embodiment of the present disclosure.

In step S702, the processor 217 displays, on the display 215, identification information of at least one first external electronic device, which has been stored in the database 214. As described above, the first external electronic device means an external electronic device for which communication with the first communication unit 211 had been previously connected.

In step S704, the processor 217 determines which one of the first external electronic devices displayed on the display 215 is selected by a user. The user may select any one first external electronic device through the remote controller 230 or by touching an input interface that is included in the display device 210.

When any one first external electronic device is selected by the user, in step S706, the processor 217 reads out, from the database 214, remote controller setting information matched with identification information of the selected first external electronic device. Furthermore, in step S708, the processor 217 resets the remote controller 230 by using the read remote controller setting information.

In contrast, when none of the displayed first external electronic devices is selected by the user, step S710 to step S724 are performed.

In step S710, the second communication unit 212 transmits a search request for the external electronic device 220 to a second external server. In step S712, the second communication unit 212 receives identification information of at least one second external electronic device from the second external server. In step S714, the display 215 displays the identification information of the at least one second external electronic device. Meanwhile, the identification information of the at least one second external electronic device may be different from the identification information of the at least one first external electronic device.

The second external server is a server for searching for the identification information of the external electronic device 220, may be a server that is separately present for each area, and stores identification information of a plurality of second external electronic devices. That is, the second external server is a server that recommends the identification information of the external electronic device 220 for which communication with the first communication unit 211 has been connected. When receiving the search request from the display device 210, the second external server may recommend at least one second external electronic device that is most used among the plurality of second external electronic devices.

Furthermore, in step S716, the processor 217 determines whether any one of the displayed second external electronic devices is selected by the user.

When identification information of any one second external electronic device is selected by the user, the processor 217 finalizes the identification information of the selected second external electronic device as identification information of the external electronic device for which communication with the first communication unit 211 has been connected. Accordingly, in step S718, the second communication unit 212 transmits the selected identification information of the second external electronic device to a first external server.

Furthermore, in step S720, the processor 217 determines whether remote controller identification information of the changed external electronic device 220 has been received from the first external server through the second communication unit 212.

When receiving the remote controller identification information of the selected second external electronic device, in step S722, the processor 217 resets the remote controller 230 by using the received remote controller identification information. If the remote controller setting information of the selected external electronic device has not been stored even in the first external server, in step S724, the processor 217 displays, on the display 215, a message for manual setting of the remote controller 230.

In contrast, although none of identification information of the displayed second external electronic devices has been selected by the user, step S724 may be performed.

Figure 8:
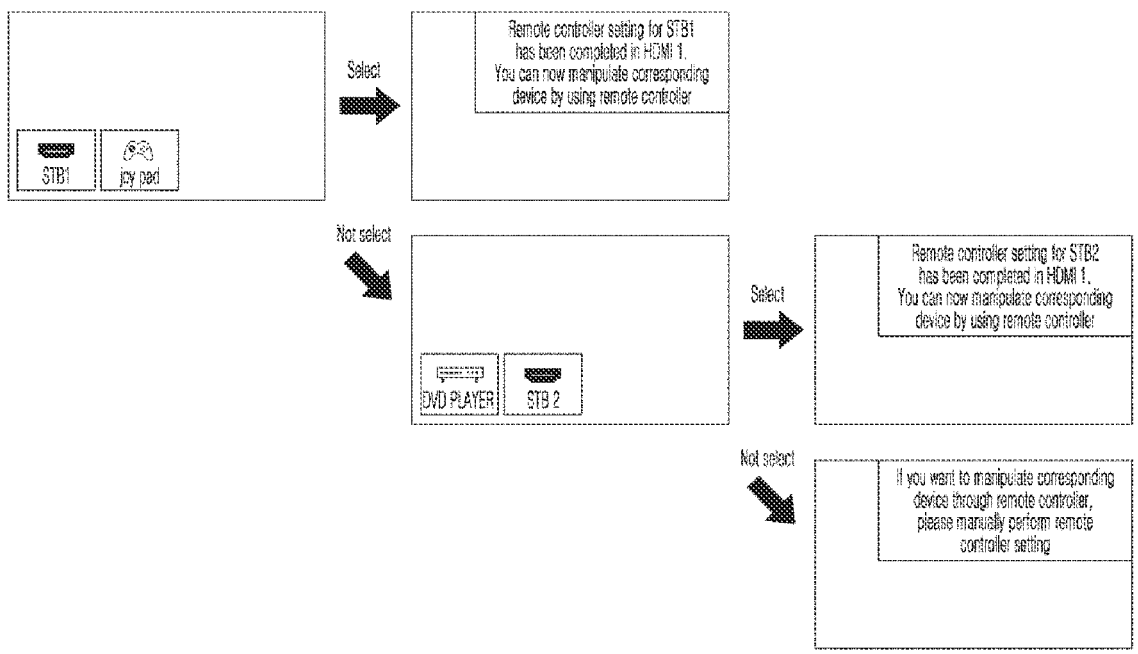
FIG. 8 is a diagram illustrating an example of information that is displayed on a display according to an embodiment of the present disclosure.

FIG. 8 illustrates an example of information that is displayed on the display 215 in FIG. 7.

For example, in the present disclosure, although the external electronic device 220 is changed in a situation in which the display device 210 is turned off, the changed external electronic device 220 can be accurately recognized. Accordingly, there is an advantage in that a malfunction can be prevented upon use of an integrated remote controller.

Furthermore, although it has been described that all the elements constituting an embodiment of the present disclosure are combined into one or are combined and operated, the present disclosure is not necessarily limited to the embodiment. That is, one or more of all the elements may be selectively combined and operated within the range of the present disclosure. Furthermore, each of all of the elements may be implemented using independent hardware, but some of or all the elements may be selectively combined and implemented as a computer program having a program module for performing the function of some or all of elements combined in a piece of or a plurality of pieces of hardware. Codes and code segments that constitute the computer program may be easily inferred by those skilled in the art of the present disclosure. Such a computer program may be stored in computer-readable media, and may implement an embodiment of the present disclosure by being read and executed by a computer. Examples of storage media of the computer program include storage media, including a magnetic recording medium, an optical recording medium, and a semiconductor recording element. Furthermore, the computer program that implements an embodiment of the present disclosure includes a program module which is transmitted in real time through an external device.

Although the present disclosure is described with reference to the illustrated drawings as described above, it is evident that the present disclosure is not restricted by the embodiments and drawings disclosed in this specification and may be modified in various ways by those skilled in the art without departing from the technical spirit of the present disclosure. Although predictable effects according to the constructions of the present disclosure have not explicitly been described while the embodiments of the present disclosure are described, effects which may be predicted by a corresponding construction should also be admitted.

The invention claimed is:

1. A display device comprising:
a first communication unit;
a database configured to store device information of an external electronic device for which communication with the first communication unit has been connected;
a memory configured to store at least one instruction; and
a processor configured to execute the at least one instruction,
wherein the processor is configured to:
determine whether the external electronic device has been changed at a second time point on the basis of device information stored in the database at a first time point and device information of the external electronic device at the second time point, and
perform an operation of resetting a remote controller that remotely controls both the display device and the external electronic device if the external electronic device has been changed at the second time point,
wherein if a NULL information, which indicates that identification information of the external electronic device connected to the display device is unknown, is received at the second time point, identification information selected by a user is determined as device information,
wherein the device information is any one of the NULL information and identification information of the external electronic device,
wherein:
the external electronic device does not transmit device information at the second time point, and the device information of the external electronic device at the second time point is the NULL information, and
the processor determines that the external electronic device has been changed when the device information stored at the first time point is first identification information, and
further comprising a display,
wherein the database matches and stores identification information of at least one first external electronic device for which communication with the first communication unit had been connected and remote controller setting information of the at least one first external electronic device,
if the external electronic device does not transmit device information at the second time point and it is determined that the external electronic device has been changed, the display displays the identification information of the at least one first external electronic device, and
when identification information of any one first external electronic device among the displayed identification information of the first external electronic devices is selected by a user, the processor performs an operation of resetting the remote controller by using remote controller setting information matched with the identification information of the any one first external electronic device.

2. The display device of claim 1, wherein the identification information comprises at least one of vendor information, model information, and electronic device type information of the external electronic device.

3. The display device of claim 1, wherein:
the first communication unit receives device information transmitted by the external electronic device at the second time point, and
the processor determines that the external electronic device has been changed when the device information stored at the first time point and the device information received at the second time point are different from each other.

4. The display device of claim 3, wherein the processor determines that the external electronic device has been changed when the device information stored at the first time point is the NULL information and the device information received at the second time point is second identification information.

5. The display device of claim 3, wherein the processor determines that the external electronic device has been changed when the device information stored at the first time point is first identification information, the device information received at the second time point is second identification information, and the first identification information is different from the second identification information.

6. The display device of claim 3, wherein the processor deletes, from the database, the device information stored at the first time point, and
stores, in the database, the device information received at the second time point.

7. The display device of claim 3, wherein:
the database matches and stores identification information of the at least one first external electronic device for which communication with the first communication unit had been connected and remote controller setting information of the at least one first external electronic device, and
when identification information identical with identification information of the changed external electronic device is present in the database, the processor resets the remote controller on the basis of remote controller setting information matched with the identical identification information.

8. The display device of claim 7, further comprising a second communication unit configured to perform communication with a first external server which matches and stores identification information of a plurality of external electronic devices and remote controller setting information of the plurality of external electronic devices,
wherein when identification information identical with the identification information of the changed external electronic device is not present in the database, the second communication unit transmits the identification information of the changed external electronic device to the first external server, and receives remote controller identification information of the changed external electronic device from the first external server, and
the processor resets the remote controller by using the received remote controller identification information.

9. The display device of claim 1, further comprising a second communication unit configured to perform communication with a second external server for searching for the identification information of the external electronic device,
wherein when none of the displayed identification information of the first external electronic devices is selected by the user, the second communication unit transmits a search request for the external electronic device to the second external server, and receives identification information of at least one second external electronic device from the second external server, and the display displays the identification information of the at least one second external electronic device, and
when the identification information of any one external electronic device among the displayed identification information of the second external electronic devices is selected by the user, the processor finalizes the selected identification information of the second external electronic device as identification information of the external electronic device for which communication with the first communication has been connected.

10. The display device of claim 9, wherein:
the communication unit performs communication with a first external server configured to match and store identification information of a plurality of external electronic devices and remote controller setting information of the plurality of external electronic devices,
the communication unit transmits the identification information of the any one external electronic device to the first external server, and receives the remote controller setting information matched with the identification information of the any one external electronic device, and
the processor resets the remote controller by using the received remote controller setting information.

* * * * *